United States Patent [19]

Morr

[11] Patent Number: 5,454,156
[45] Date of Patent: Oct. 3, 1995

[54] APPARATUS AND METHOD FOR INSERTING STATOR COILS

[76] Inventor: Charles W. Morr, 7615 Ivory Ter., New Port Richey, Fla. 34655

[21] Appl. No.: 228,992

[22] Filed: Apr. 18, 1994

[51] Int. Cl.$^6$ .................................................. H02K 15/06
[52] U.S. Cl. ............................. 29/596; 29/606; 29/732
[58] Field of Search ...................... 29/596, 606, 281.5, 29/281.1, 732, 734, 736

[56] References Cited

U.S. PATENT DOCUMENTS

| | | | |
|---|---|---|---|
| 3,841,133 | 10/1974 | Rice, Jr. | 29/606 X |
| 4,970,774 | 11/1990 | Barrera | 29/596 |
| 5,022,139 | 6/1991 | Jensen | 29/606 X |

*Primary Examiner*—S. Thomas Hughes
*Attorney, Agent, or Firm*—Joseph C. Mason, Jr.; Ronald E. Smith

[57] ABSTRACT

An annular tool for insertion of stator coils to a stator includes a plurality of circumferentially spaced pivotally mounted cuff support fingers to facilitate separation of the tool from the stator after the coils have been inserted. The tool is in the form of an annular base member having a central opening that receives a conventional insertion tool. An annular shoulder formed in the base member supports a stator about its periphery during the coil insertion process. The cuff support fingers are biased into a position of repose where they extend radially inwardly into the central opening. When the coil insertion process is completed, the fingers pivot upwardly to allow the tool to slide downwardly with respect to the insertion tool so that the tool is separated from the stator and coils. The completed stator and coils and the tool are then removed from the insertion tool.

7 Claims, 7 Drawing Sheets

APPARATUS AND METHOD FOR INSERTING STATOR COILS

BACKGROUND OF THE INVENTION

1. Field of the invention

This invention relates, generally, to devices and methods having utility in the assembling of electric motors. More particularly, it relates to an apparatus and method for inserting coils on electric motor stators.

2. Description of the prior art

Electric motor stators are generally ring-shaped and include a plurality of equidistantly spaced apart, radially inwardly projecting teeth separated by slots. As is well known, coils of copper wire are inserted in the slots between the teeth. In the early days of electric motors, the coils were painstakingly inserted by hand, but machines for coiling the wire were eventually developed. However, the step of inserting the coils into the individual slots is still performed by hand in many applications.

One of the most helpful tools that has been developed is the coil insertion tool. It is a free standing device with a broad cylindrical base, a narrower cylindrical middle section, and a still narrower cylindrical top section.

Coils to be inserted into the slots between the stator teeth are first inserted onto the insertion tool. A typical coil assembly will include a plurality of looped sections in a circular pattern, i.e., the looped sections surround a central opening. This opening is slipped over the cylindrical middle section of the insertion tool, and the coil assembly is supported in that position by the broader base, i.e., the diameter of the central opening in the coil assembly is less than the diameter of the insertion tool base.

A cuff support tool having a central opening is then inserted over the top section of the insertion tool. A plurality of cuff support fingers extend radially inwardly from the central opening, and rest atop an annular shoulder formed where the top section of the insertion tool meets the middle section thereof.

Next, the stator is nested within the cuff support tool. In semi-automatic applications, a hydraulic ram is then used to pull the coils into their associated slots.

Where the above-described semi-automatic insertion is employed, a standard cuff support tool cannot be used. Instead, the cuff support teeth must be cammed radially inwardly and outward from the stator teeth. Such required special construction adds to the cost of making the cuff support tool, and as a result, semi-automatic coil insertion is seldom employed. Moreover, the known semi-automatic coil insertion tools require attachment to a machine, either for support or to facilitate operation. Nor do they protect the coils from abrasion at the time of insertion. They also do not provide proper containment of the lead end of the coils; this leads to the coils being hooked by the lacing needle.

There are numerous applications, however, where the cost of a machine that fully automates the coil insertion procedure cannot be justified. Thus, there is a need for an improved cuff support tool that is inexpensive to manufacture so that semi-automatic coil insertion could be economically performed. The ideal tool would be light-in-weight and would not require attachment to a machine for any reason. It would also protect the coils from abrasion when they are inserted into the stator. It would further provide lead end coil containment.

However, at the time the present invention was made, it was not obvious to those of ordinary skill in this are how an improved tool could be provided, in view of the art considered as a whole.

SUMMARY OF THE INVENTION

The longstanding but heretofore unfulfilled need for an improved cuff support tool has now been fulfilled.

The novel tool includes a plurality of cuff support fingers that are biased into their operative configuration, but which are pivotally mounted so that they retract easily to facilitate tool removal when the semi-automatic coil insertion process is completed. Significantly, no camming of such fingers is required, and the tool is thus inexpensive to manufacture and easily affordable by all shops desiring to semi-automatically insert stator coils.

More specifically, the novel tool for facilitating the insertion of wire coils onto an electric motor stator includes a base member having a cylindrical configuration, said cylindrical configuration defining a central opening, an annular shoulder formed in said base member in open communication with said central opening, a plurality of equidistantly spaced apart, circumferentially disposed, radial slots formed in said base member about a perimeter thereof, each of said slots having a first end in open communication with a top end of said base member and having a closed second end, a cuff support member positioned within each of said slots, pivotal mounting means for pivotally mounting each cuff support member within its associated slot, said pivotal mounting means enabling each cuff support member to pivot toward said top end of said base member but not toward said bottom end of said base member, a bias means for urging each cuff support member into an unpivoted position of repose, and each cuff support member including a cuff support finger that extends radially into said central opening, whereby a stator is supported by said annular shoulder when stator coils are inserted into said stator, whereby each of said cuff support fingers underlies a tooth formed in said stator, and whereby said cuff support members pivot to facilitate disengagement of said tool from said stator after said stator coils have been inserted.

It should therefore be clear that a primary object of this invention is to provide a tool for facilitating the semi-automatic insertion of stator coils.

A more specific object is to provide such a tool in a form that is easy to manufacture and hence affordable.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
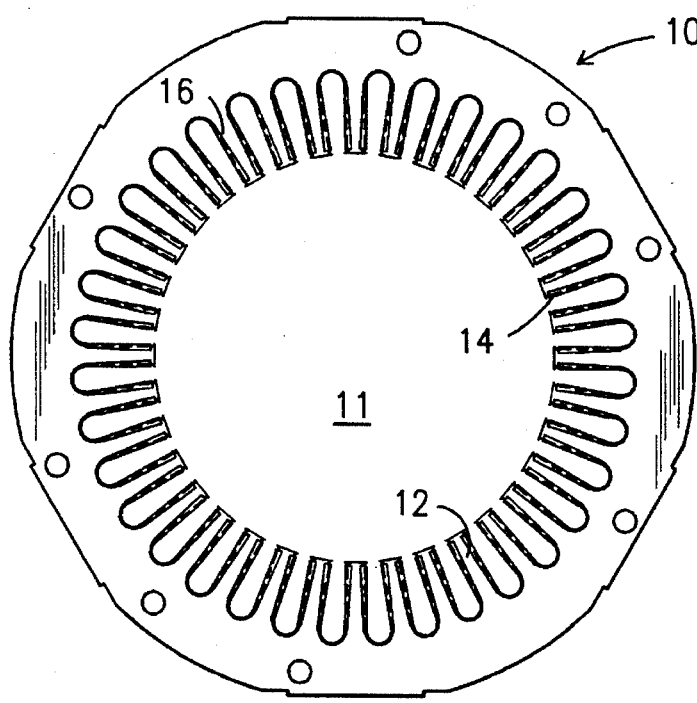
FIG. 1 is a top plan view of a conventional stator before copper wire coils are inserted between the teeth thereof.

Referring now to FIG. 1, a conventional stator 10 is depicted in plan view. Stator 10 has a generally annular construction and includes a central opening 11 defined by a plurality of radially inwardly extending teeth 12 that are equidistantly and circumferentially spaced about said central opening 11 as depicted. A plurality of U-shaped slots, collectively denoted 14, are defined between teeth 12; said slots receive associated wire bundles when the stator has been properly wired.

A U-shaped plastic insulating cuff 16 is positioned within each slot in lining relation thereto. Cuffs 16 serve the purpose of electrically insulating the wires from teeth 12 and protecting said wires from abrasion by said teeth as well.

Figure 3:
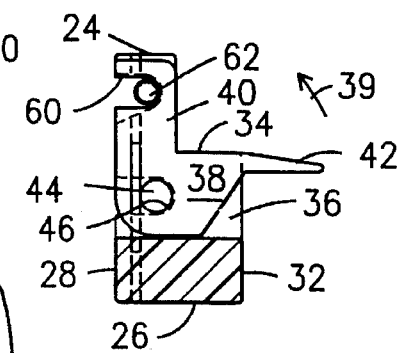
FIG. 3 is a sectional view taken along line 3—3 in FIG. 2.
Figure 4:
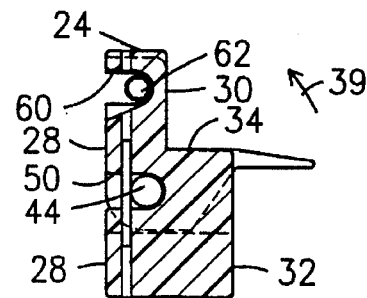
FIG. 4 is a sectional view taken along line 4—4 in FIG. 2.
Figure 2:
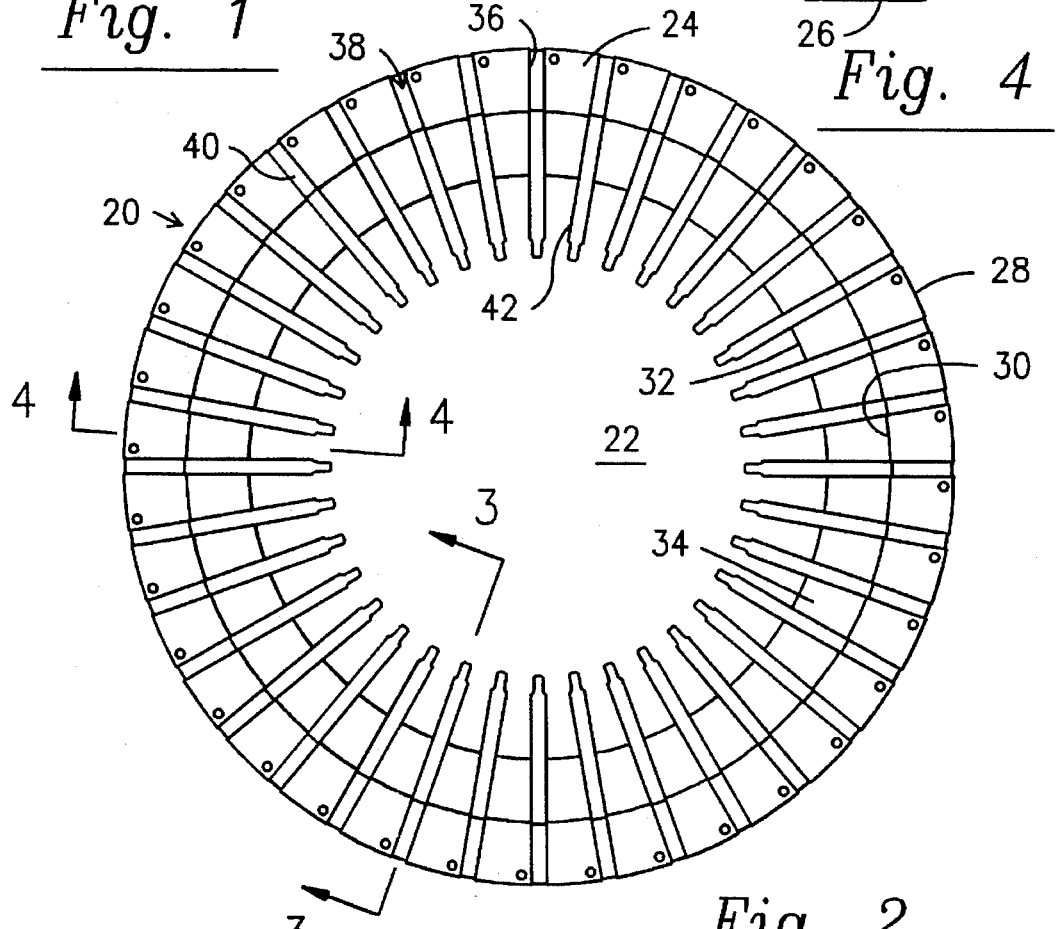
FIG. 2 is a top plan view of the novel cuff support tool.

The novel cuff support tool is denoted 20 as a whole in FIG. 2 and is shown in section in FIGS. 3 and 4. It is generally annular in configuration and includes a central opening 22, an annular top wall 24, annular bottom wall 26, cylindrical outer wall 28, cylindrical inner wall 30 having a first predetermined diameter, cylindrical inner wall 32 having a second predetermined diameter less than said first predetermined diameter, and an annular shoulder 34 defined by the difference in diameters of said first and second inner walls 30 and 32. It is made of light weight material so that it can be easily hand loaded by an operator for each coil insertion operation and then reused. It is not attached to any machine part.

A plurality of circumferentially and equidistantly spaced blind slots, collectively denoted 36, begin in top wall 24 and terminate in a plane below the plane of annular shoulder 34, as perhaps best understood in connection with FIG. 3. Note by comparing FIGS. 1 and 2 that slots 36 are radially oriented in the same manner as the teeth 12 of stator 10.

A cuff support member 38, preferably of metallic construction, is positioned within each of said slots. More particularly, each cuff support member 38 includes a flat base 40 substantially housed within its associated slot, and a radially inwardly extending cuff support finger 42 formed integrally therewith.

Each cuff support member 38 is pivotally mounted within its associated slot 36. A pivot pin 44 (FIGS. 3 and 4) associated with each member 38 extends through an aperture 46 formed in base 40 of each member 38. Annular groove 50 is formed in outer cylindrical wall 28 and accommodates said pivot pins; it completely circumscribes said outer wall 28 to facilitate the manufacturing process.

A second annular groove 60 is also formed in said outer cylindrical wall 28; it also extends completely around wall 28 to facilitate manufacturing of cuff support tool 20. It accommodates an annular bias means 62 that urges each cuff support member 38 into its unpivoted position of repose as depicted in FIGS. 2-4. Of course, a small torsion spring (not shown) associated with each pivot pin 44, or any other suitable bias means, could be employed to bias each cuff support member 38 into its position of repose. The single, continuous loop bias means 62 seated within annular groove 60 is believed to be more economical to manufacture that would be a plurality of individual bias means associated with each cuff support member 38. It should also be observed from FIGS. 3 and 4 that each cuff support member 38 may pivot in the direction of the directional arrows 39, but not in the opposite direction.

Figure 5:
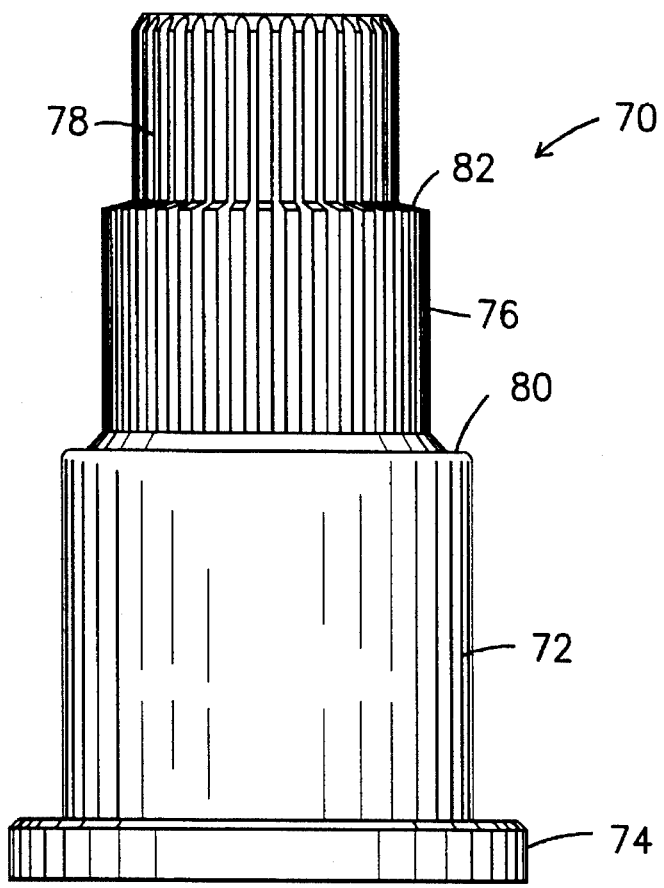
FIG. 5 is a side elevational view of an insertion tool.
Figure 6:
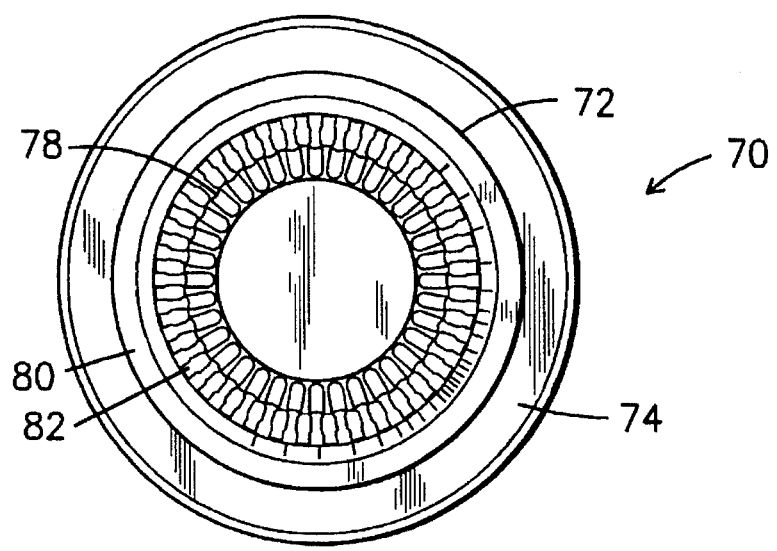
FIG. 6 is a top plan view of the tool depicted in FIG. 5.

FIGS. 5 and 6 depict a conventional coil insertion tool 70 with which novel tool 20 is used. Insertion tool 70 is a free standing tool that includes an upstanding cylindrical base 72 stabilized by flange 74. A smaller in diameter middle part 76 surmounts base 72 and a still smaller in diameter top part 78 surmounts middle part 76. Said differences in diameter produce annular shoulders 80 and 82, respectively.

Figure 7:
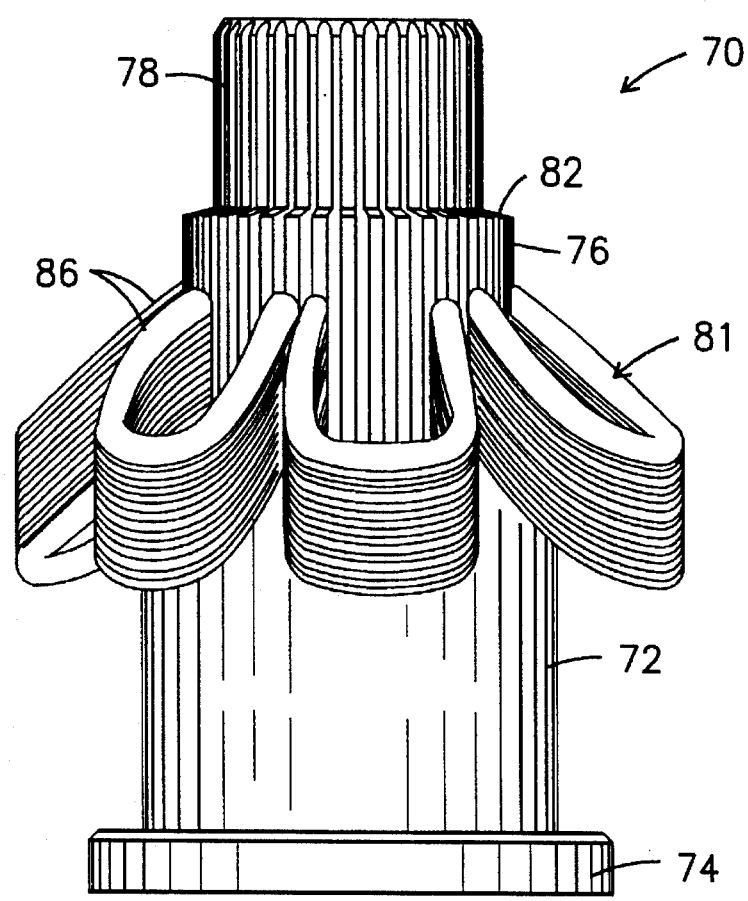
FIG. 7 is a side elevational view of a stator coil inserted over the insertion tool.
Figure 8:
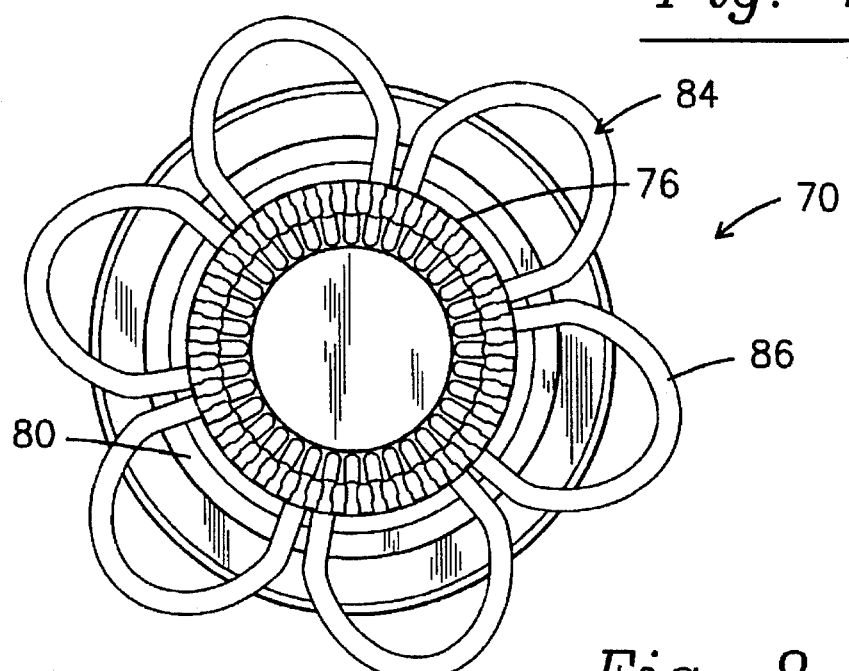
FIG. 8 is a top plan view of the assembly of FIG. 7.

The first step in the method that employs the novel tool is conventional; it is depicted in FIGS. 7 and 8. A coil of wire 84 having plural loops 86 around a central opening is first positioned in encircling relation to middle part 76 of insertion tool 70; it is supported by annular shoulder 80.

Figure 9:
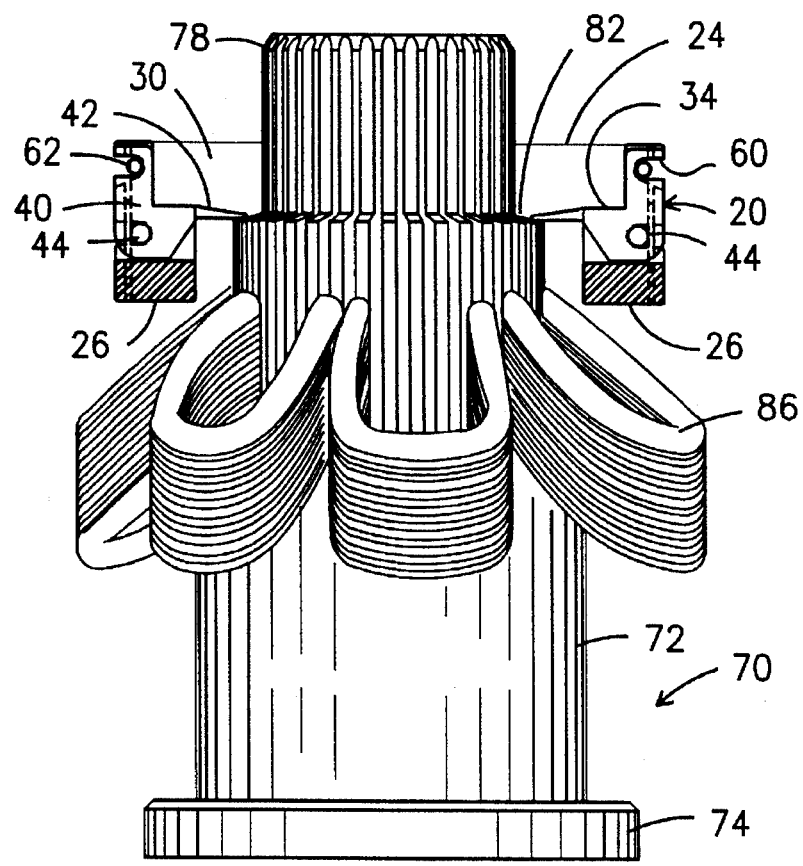
FIG. 9 is a side elevational view of the assembly of FIG. 7 after the novel cuff support tool has been added thereto.
Figure 10:
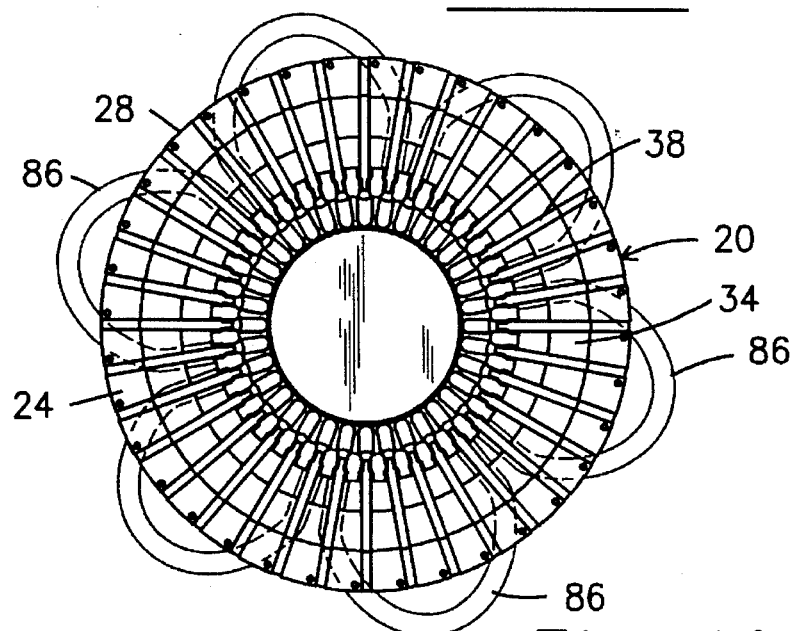
FIG. 10 is a top plan view of the assembly depicted in FIG. 9.

As depicted in FIGS. 9 and 10, novel cuff support tool 20 is then inserted over the top part 78 of insertion tool 70 as shown; note that cuff support fingers 42 are in repose and are in abutting engagement with annular shoulder 82.

Figure 11:
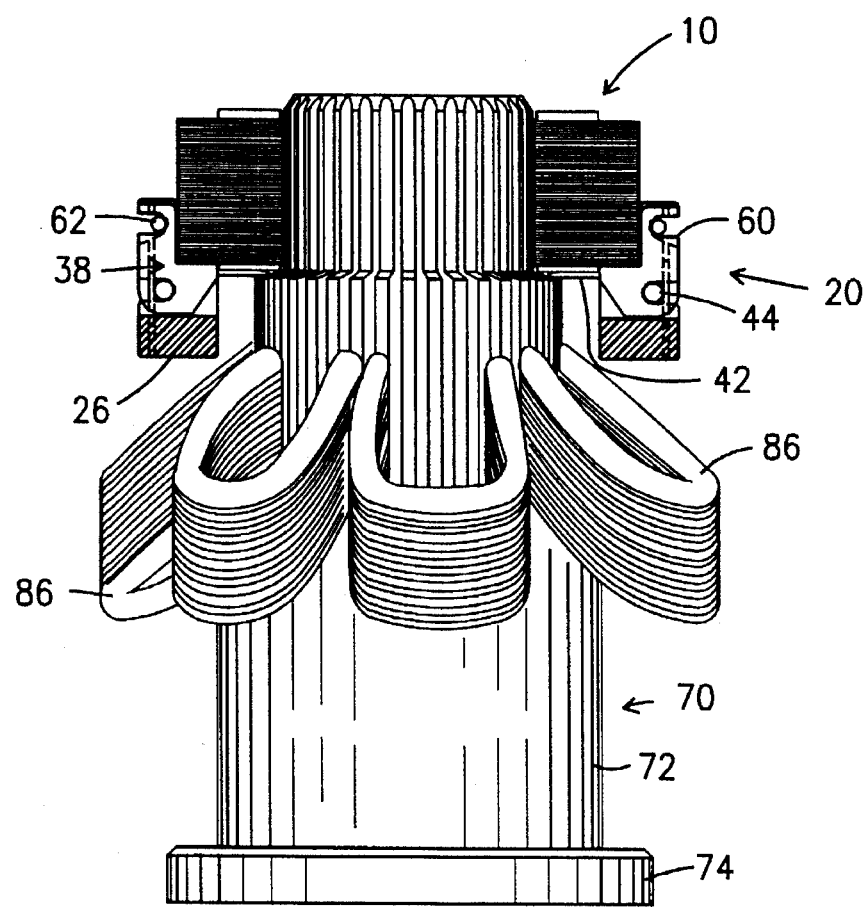
FIG. 11 is a side elevational view of the assembly of FIG. 9 after a laminated stator core has been added to it.
Figure 12:
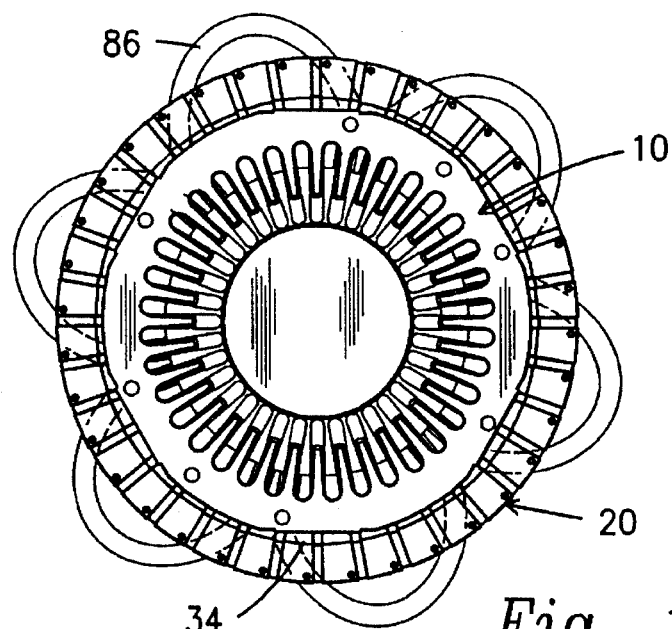
FIG. 12 is a top plan view of the assembly of FIG. 11.

Stator 10 is then deposited atop annular shoulder 34 of the novel tool 20, as depicted in FIGS. 11 and 12, and teeth 12 of stator 10 are placed in vertically aligned registration with cuff support fingers 42 of tool 20.

Figure 13:
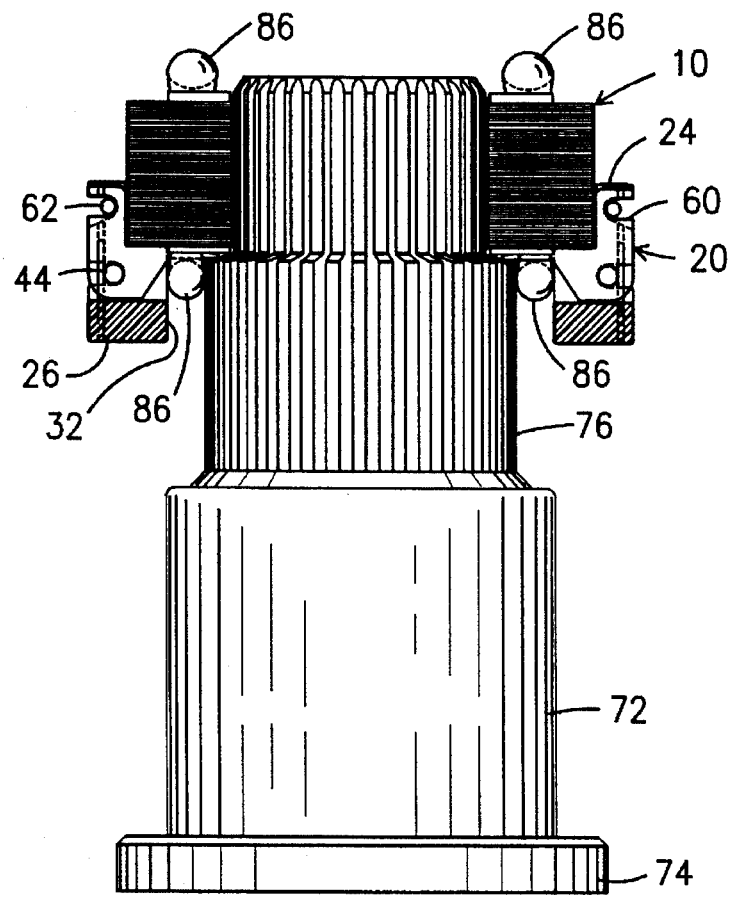
FIG. 13 is a side elevational view of the assembly of FIG. 11 after the stator coils have been inserted into the slots between the stator teeth.
Figure 14:
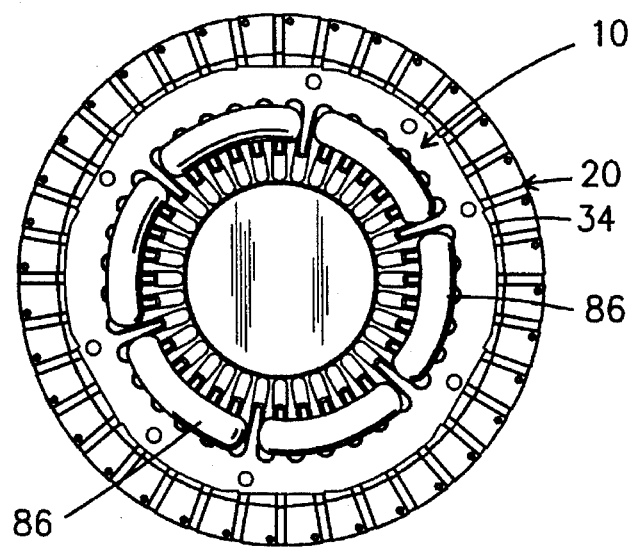
FIG. 14 is a top plan view of the assembly of FIG. 13.

Wire loops 86 are then pulled upwardly from their FIG. 11 position into their FIG. 13 position by a conventional hydraulic ram, not shown; this inserts the wires into their associated slots as best shown in FIG. 14. This is the only step of the procedure where a machine is employed. In all other respects, the novel operation is manual. Thus it is said that the novel method is semi-automatic. Note in FIG. 13 how the leading end of coils 86 are contained by novel tool 20, i.e., said coils are positioned between middle part 76 of insertion tool 70 and cylindrical inner wall 32 of said tool 20. Note further how cuff support fingers 42 protect the coils from abrasion by the sharp lower edges of slots 14 formed in the stator; they also protect insulating cuffs 16 from bending. Moreover, they prevent coils 86 from abutting the bottom of the stator; if said coils touch the bottom of the stator, they interfere with operation of the lacing needles as those skilled in this art will appreciate.

Figure 15:
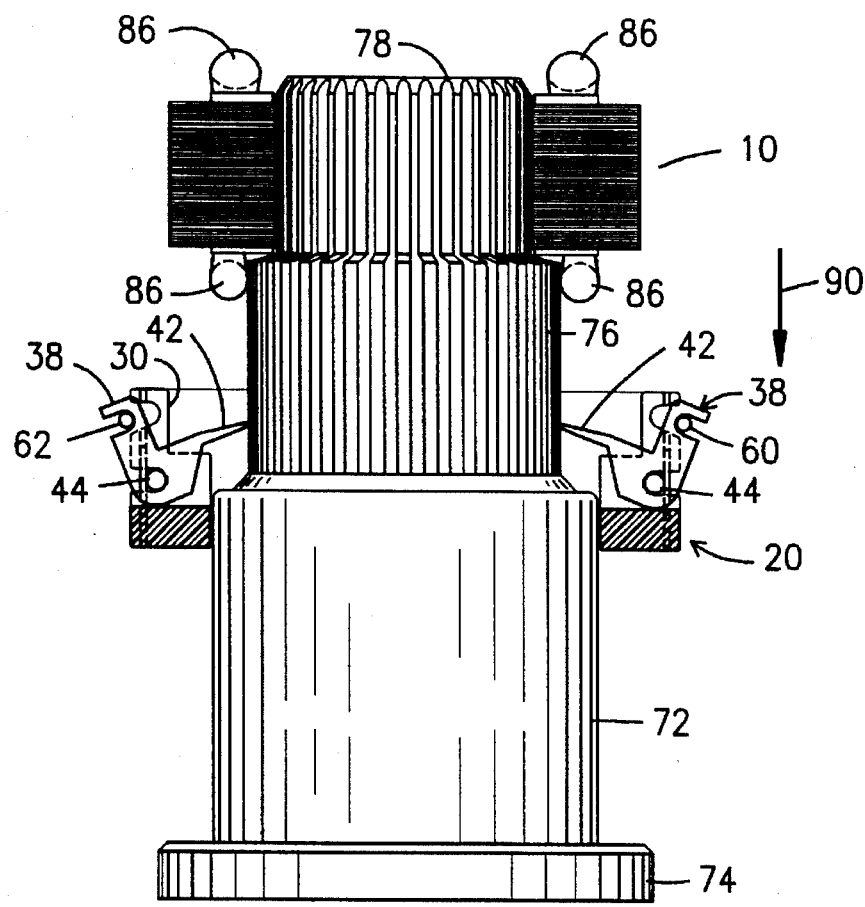
FIG. 15 is a side elevational view of the assembly of FIG. 13 after the novel cuff support tool has been disengaged from the completed stator coil assembly.
Figure 16:
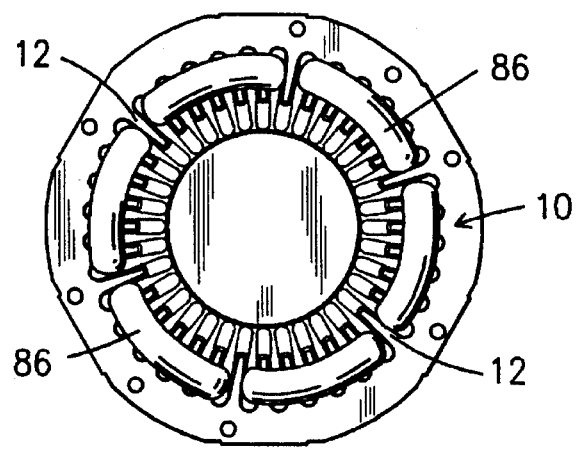
FIG. 16 is a top plan view of a completed stator after it has been removed from the assembly of FIG. 15.

Novel tool 20 is then displaced downwardly along middle section 76 of the insertion tool as depicted in FIG. 15 and as denoted by directional arrow 90; note how each cuff support member 38 pivots and displaces in an upward direction to allow disengagement of tool 20 and stator 10. Once tool 20 is in its FIG. 15 position, the completed stator 10 is lifted from insertion tool 70; tool 20 is then lifted therefrom in the same way and the above-described coil insertion process may be repeated. FIG. 16 depicts the fully assembled stator 10 with coils 86 in place.

Unlike its prior art counterparts, the novel tool is not attached to any machine structure for support or to facilitate its operation.

This invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A tool for facilitating the insertion of wire coils onto an electric motor stator, comprising:

a base member having a cylindrical configuration, said cylindrical configuration defining a central opening;

an annular shoulder formed in said base member in open communication with said central opening;

a plurality of equidistantly spaced apart, circumferentially disposed slots formed in said base member about a perimeter thereof, each of said slots having a first end in open communication with a top end of said base member and having a closed second end;

a cuff support member positioned within each of said slots;

pivotal mounting means for pivotally mounting each cuff support member within its associated slot;

said pivotal mounting means enabling each cuff support member to pivot toward said top end of said base member but not toward said bottom end of said base member;

a bias means for urging each cuff support member into an unpivoted position of repose; and each cuff support member including a cuff support finger that extends radially into said central opening;

whereby a stator is supported by said annular shoulder when stator coils are inserted into said stator;

whereby each of said cuff support fingers underlies a tooth formed in said stator; and whereby said cuff support members pivot to facilitate disengagement of said tool from said stator after said stator coils have been inserted.

2. The tool of claim 1, wherein said bias means is an annular bias means that circumscribes said tool, said bias means having a diameter less that a diameter of said tool.

3. The tool of claim 2, further comprising a first annular groove that circumscribes said base member, said annular bias means being disposed within said first annular groove.

4. The tool of claim 3, further comprising a second annular groove that circumscribes said base member, said pivoting means being disposed within said second annular groove.

5. The tool of claim 4, wherein each of said cuff support members has a channel formed therein at a first end thereof to accommodate said bias means.

6. The tool of claim 5, wherein each of said cuff support members has an opening formed at a second end thereof to accommodate said pivoting means.

7. A method for inserting coils into a stator, comprising the steps of:

inserting a coil having a central opening onto a middle part of an insertion tool having a base, a middle part, a top part, and an annular shoulder between said top and middle parts;

inserting a cuff support tool having a central opening, an annular shoulder encircling said central opening, and pivotally mounted cuff support members, onto said insertion tool such that said cuff support fingers abuttingly engage said annular shoulder;

positioning a stator atop the annular shoulder of said cuff support tool;

inserting the wires of said coil into said stator;

displacing said cuff support tool away from said stator in a direction toward the base of said insertion tool, said displacing causing said cuff support fingers to pivot away from their respective positions of repose;

lifting said completed stator from said insertion tool; and lifting said cuff support tool from said insertion tool.

* * * * *